US011743353B1

United States Patent
Flanagan et al.

(10) Patent No.: US 11,743,353 B1
(45) Date of Patent: Aug. 29, 2023

(54) SYSTEM, METHOD, AND COMPUTER PROGRAM FOR PROVIDING A CONTENT FEED TO A USER RELATED TO A REGISTRY AND A REGISTRY EVENT HAVING AN EVENT TIMELINE

(71) Applicant: Baby List, Inc., Oakland, CA (US)

(72) Inventors: August Flanagan, Berkeley, CA (US); Ian Pearce, Emeryville, CA (US); Aaron Smith, Walnut Creek, CA (US)

(73) Assignee: Baby List, Inc., Oakland, CA (US)

( * ) Notice: Subject to any disclaimer, the term of this patent is extended or adjusted under 35 U.S.C. 154(b) by 167 days.

(21) Appl. No.: 16/719,610

(22) Filed: Dec. 18, 2019

(51) Int. Cl.
*G06Q 30/0601* (2023.01)
*H04L 67/143* (2022.01)
*H04L 67/53* (2022.01)

(52) U.S. Cl.
CPC .......... *H04L 67/53* (2022.05); *G06Q 30/0601* (2013.01); *H04L 67/143* (2013.01)

(58) Field of Classification Search
CPC .... H04L 67/20; G06Q 30/0601; H04L 67/143; G06Q 30/0629; G06Q 30/0603; G06Q 30/0611
See application file for complete search history.

(56) References Cited

U.S. PATENT DOCUMENTS

| | | | | |
|---|---|---|---|---|
| 6,611,814 B1* | 8/2003 | Lee et al. | .......... | G06Q 30/0601 705/26.7 |
| 7,756,753 B1* | 7/2010 | McFarland | ............ | G06Q 30/02 705/26.1 |
| 7,877,289 B1 | 1/2011 | Cunningham et al. | | |
| 8,510,145 B2* | 8/2013 | Rowland | ............... | G06Q 30/06 705/7.13 |
| 8,612,312 B1* | 12/2013 | Edwards et al. | ... | G06Q 30/0633 705/26.81 |
| 8,751,281 B2* | 6/2014 | Chaushev | .............. | G06Q 10/06 705/7.22 |
| 9,787,521 B1* | 10/2017 | Boynes | ................. | G06Q 30/06 |
| 10,783,151 B1* | 9/2020 | Bushkin et al. | ..... | H04L 67/306 |
| 11,295,364 B1 | 4/2022 | Flanagan et al. | | |

(Continued)

OTHER PUBLICATIONS

Pathak, Bhavik K. "Comparison Shopping Agents and Online Price Dispersion: A Search Cost based Explanation", Journal of Theoretical and Applied Electronic Commerce Research, Vol. 7, Issue 1, Apr. 2012, pages 64-76.

*Primary Examiner* — Kamal B Divecha
*Assistant Examiner* — Sandarva Khanal
(74) *Attorney, Agent, or Firm* — Lessani Law Group, PC

(57) ABSTRACT

The present invention provides a content feed to a user, where the content feed is related to a registry and a registry event having an event timeline. The system receives a request for a content feed for a user from a client application. A plurality of sessions of content items is provided iteratively to the client application for rendering the content items in a user interface where a new session is added to the feed history for the user when the previous session expires. For each session, content items related to the user's registry or registry event are grouped into the session. The session is added to a feed history for the user, an expiration time is set for the session, and the feed history including the content items in the session and all previous sessions are provided to the user interface in the client application.

15 Claims, 11 Drawing Sheets

(56) References Cited

U.S. PATENT DOCUMENTS

| | | | |
|---|---|---|---|
| 2003/0066093 | A1* | 4/2003 | Cruz-Rivera et al. ................. H04N 21/4331 725/146 |
| 2003/0131021 | A1 | 7/2003 | Wight et al. |
| 2007/0204308 | A1* | 8/2007 | Nicholas et al. ..... H04N 21/222 725/86 |
| 2007/0299736 | A1 | 12/2007 | Perrochon et al. |
| 2008/0288332 | A1 | 11/2008 | Altounian et al. |
| 2009/0216549 | A1 | 8/2009 | Causey et al. |
| 2010/0287256 | A1* | 11/2010 | Neilio ................... G06Q 10/10 709/217 |
| 2011/0184855 | A1* | 7/2011 | Webber et al. ........ G06Q 20/12 705/39 |
| 2011/0185390 | A1* | 7/2011 | Faenger et al. .... G01C 21/3688 725/75 |
| 2011/0264460 | A1* | 10/2011 | Jagemann et al. ..... G16H 70/60 705/2 |
| 2011/0320437 | A1* | 12/2011 | Kim et al. ........... G06F 16/958 707/E17.014 |
| 2012/0150882 | A1* | 6/2012 | Deutsch ............. G06F 16/9535 707/755 |
| 2013/0024452 | A1* | 1/2013 | Defusco et al. ...... G06Q 10/103 707/E17.089 |
| 2013/0054404 | A1 | 2/2013 | Garcia |
| 2013/0117151 | A1* | 5/2013 | Macaisa et al. ... G06Q 30/0633 705/26.8 |
| 2014/0012765 | A1* | 1/2014 | Kruglick ............... G06Q 10/30 705/308 |
| 2014/0019267 | A1 | 1/2014 | Stoliartchouk et al. |
| 2014/0279207 | A1* | 9/2014 | Agarwal et al. ... G06Q 30/0633 705/26.7 |
| 2016/0140519 | A1 | 5/2016 | Trepca et al. |
| 2016/0188606 | A1* | 6/2016 | Bandyopadhyay et al. ................. G06F 16/951 707/706 |
| 2016/0188725 | A1* | 6/2016 | Wang et al. ........ G06F 16/9535 707/734 |
| 2017/0039578 | A1 | 2/2017 | Woddi et al. |
| 2017/0076349 | A1* | 3/2017 | Rohach Miller et al. ................... G06F 40/106 |
| 2017/0193591 | A1 | 7/2017 | Narasimhan et al. |
| 2018/0005304 | A1* | 1/2018 | Amacker et al. .. G06Q 30/0633 |
| 2018/0181873 | A1* | 6/2018 | Chen ................ H04L 51/214 |
| 2019/0057145 | A1* | 2/2019 | Huang et al. ....... G06F 16/3329 |
| 2020/0410025 | A1* | 12/2020 | Arunmozhi et al. G06F 16/9536 |

\* cited by examiner

SYSTEM, METHOD, AND COMPUTER PROGRAM FOR PROVIDING A CONTENT FEED TO A USER RELATED TO A REGISTRY AND A REGISTRY EVENT HAVING AN EVENT TIMELINE

BACKGROUND OF THE INVENTION

1. Field of the Invention

This invention relates generally to registry systems, and more specifically to a system and method for providing a content feed to a user related to a registry and a registry event having an event timeline.

2. Description of the Background Art

Over the past few decades, there has been a pronounced shift in the way people engage with the world. E-commerce has overtaken brick-and-mortar stores as the avenue of choice in making purchases. People interact with a network of friends online through email, text messaging, video chat, and social media. Research is performed at the click of the fingertips. The internet has provided individuals with a way of experiencing life through a different medium.

A registry is typically a wish list of products often related to an event, such as a wedding or the birth of a child. But consistent with the changes in the way people engage with the world, there is demand for more of a curated, personalized registry experience. While some registry services provide users with a wish list and a way for the user to add products from stores to his or her registry, none of the prior art provides a curated, customized registry creation experience that delivers a variety of content to the user in a time-based fashion that is specific to the user's registry and registry event.

SUMMARY OF THE DISCLOSURE

The present disclosure describes a system, method, and computer program for providing a content feed to a user related to a registry and registry event having an event timeline. Through the content feed, the system provides a curated, personalized registry-creation experience that is specific to a user's registry event timeline. The method is performed by a computer system that provides user registries ("the system").

The system provides a registry-related content feed to a user via a client application. The user's content feed includes content items in a variety of formats (e.g., e-commerce items, video, social media post, etc.), and at least some of the content is selected for the user based on the user's registry event timeline. Content for the user's feed is grouped into sessions, and sessions are iteratively provided to the user, where a new session is added to the top of the content feed when the previous session expires.

For each session, content items related to the user's registry or registry event are grouped into the session, where each content item has a selection type and a format type. The session is added to a feed history for the user, an expiration time is set for the session, and the content items in the session are provided to the client application. For a plurality of the sessions, the session includes a content item having an ecommerce format type and a content item having a time-to-event selection type.

In one embodiment, a method for providing a content feed to a user related to a registry and registry event having an event timeline, comprises the following steps:

receiving at a server a first request for a content feed for a user from a client application; providing a first session of content items to the client application for rendering the content items in a user interface, wherein providing the first session comprises:
grouping a plurality of content items into a first session of content items for the user, wherein the content items are related to the user's registry or the user's registry event and wherein each content item has a selection type and a format type,
adding the first session to a feed history for the user,
setting an expiration time for the first session, and
providing the content items in the first session to the client application;
determining that the first session has expired;
providing a new session of content items to the client application for rendering a set of new content items in the user interface of the client application, wherein providing the new session comprises:
creating a new session for the user with a plurality of new content items related to the user's registry or the user's registry event and wherein each new content item has a selection type and a format type,
adding the new session to the feed history for the user,
setting an expiration time for the new session, and
providing the content items in the new session to the client application;
repeating the step of providing a new session after the expiration of a previous session for a number of iterations such that, with each iteration, a different new session is added to the user's feed history and, wherein, for a plurality of the sessions, the session includes a content item having an ecommerce format type and a content item having a time-to-event selection type.

DETAILED DESCRIPTION OF THE PREFERRED EMBODIMENTS

The present disclosure describes a system, method, and computer program for providing a content feed to users related to a user's registry and registry event timeline. The method is performed by a computer system that provides user registries ("the system"), such as the computer system illustrated in FIG. 1. In certain embodiments, the content feed is authored, versioned, and published using a content management system (CMS).

Through the content feed, the system provides a curated, personalized registry-creation experience that is specific to a user's registry event timeline. A user's content feed includes content items that enable or prompt a user to add products to a user's registry, as well as content items selected for the user based on the user's event timeline or date. The various content items are incrementally inserted into the user's feed. More specifically, the system groups different types of content into sessions and incrementally adds sessions to a user's content feed. In certain embodiments, the content feed includes more than 20 sessions, where each session lasts eight or more hours. In certain embodiments, a plurality of sessions each include predetermined content for the session (e.g., curated content selected for all users and inserted into sessions based on session number) and user-dependent dynamic content that provides the personalized experience. User-dependent content may include content items based on the user's event timeline, user preferences, user profile, user behavior, products added to the user's registry, user or event location, and/or season of the registry event. In certain embodiments, certain content items, such as a notification that a product has been purchased from a registry, may be sent to the user in real time between sessions.

Figure 1:
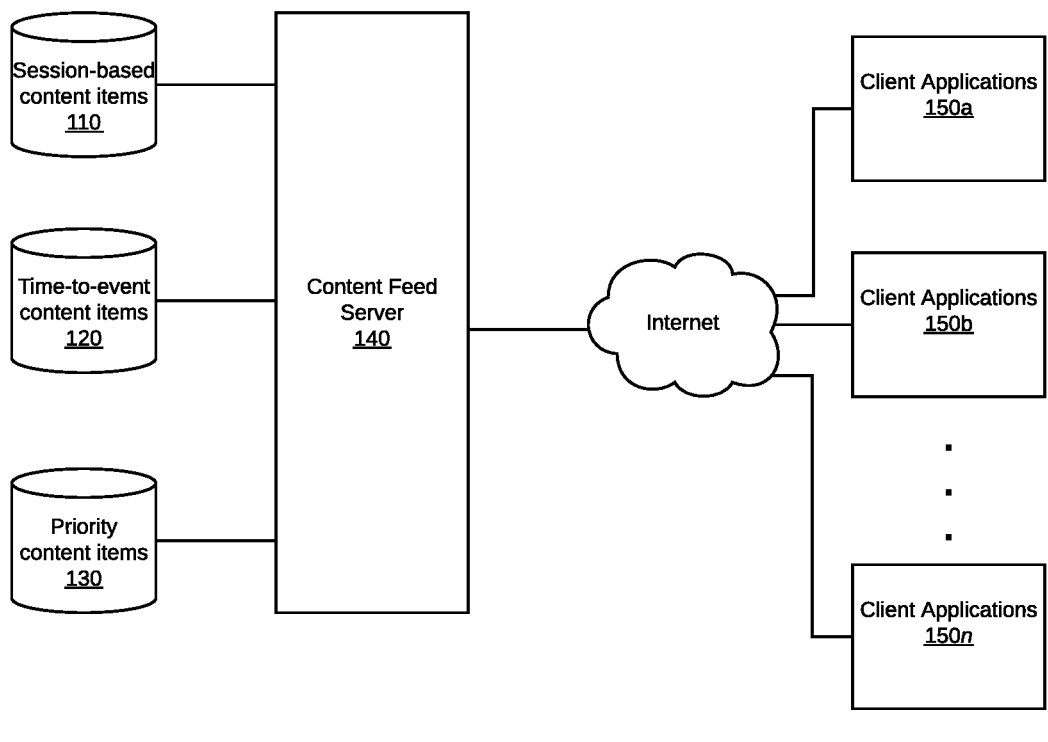
FIG. 1 is a block diagram that illustrates an example software architecture according to one embodiment.

FIG. 1 illustrates an example architecture for a system that performs the methods described herein. However, the methods described herein may be implemented in other systems and are not limited to system 100. System 100 maintains a datastore of content items that have different selection types. For example, session-based content items, time-to-event content items, and priority content items are illustrated in databases 110, 120, and 130, respectively, but could also be illustrated in one database or another grouping of databases. The datastore of content items 110, 120, and 130 are connected to a content feed server 140 that performs the methods described below and provides content feed over the internet to a plurality of users' client applications 150a-150n.

Example implementations of the method are described in more detail with respect to FIGS. 2-5G.

Figure 2:
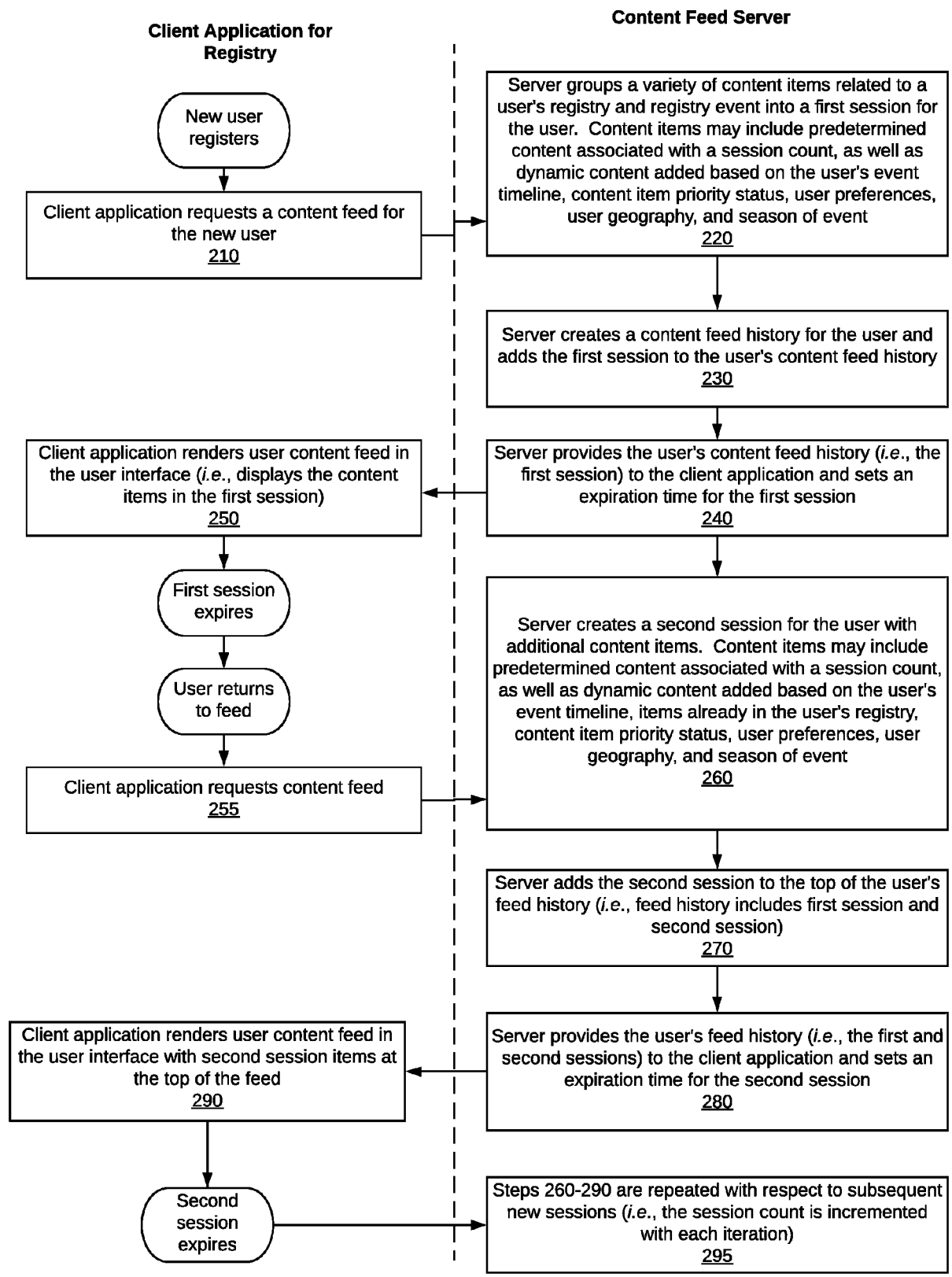
FIG. 2 is a flowchart that illustrates a method, according to one embodiment, for providing a content feed to a user related to a registry and a registry event having an event timeline.

FIG. 2 illustrates a method, according to one embodiment, for providing a content feed from the content feed server 140 to a client application 150 related to a registry and a registry event having an event timeline. As seen in FIG. 2, a new user registers his or her information with the client application 150. The client application 150 requests a content feed for the new user (step 210). The content feed server 140 receives the request and groups content items related to the user's registry and registry event into a first session for the user (step 220).

Content items are associated with a selection type and a format type. The selection type and format type of the content items are ways of describing how the content items are selected and in what format they are rendered in the user interface and, therefore, are not mutually exclusive characteristics. For example, a content item can have a time-to-event selection type and a video format type. A session may have content items with a plurality of different selection types and format types.

With respect to selection type, in one embodiment, the system may select the following types of content for a session:

Predetermined content items for the session ("session-based content items"). Session-based content items are items that have been assigned to a certain session. For example, certain content items may always appear in every user's first session.

Active priority items having a limited duration (e.g., priority-based content items 130), such as temporary merchant promotions. In certain embodiments, priority content items have start time and end time parameters that indicate when the priority content items are in effect.

Content items dynamically selected for a session based on user-dependent criteria, such as the user's event timeline (e.g., time-to event content items 120), user preferences, products already in a user's registry, etc.). For a baby or wedding registry, time-to-event content items may be selected based on the baby's due date, the wedding date, or a baby shower/wedding shower date.

Content items may have the following format types: an ecommerce content item, a feature content item, a guide content item, a social network content item, a video content item, a sample registry, etc. For example, an ecommerce content item may include products that can be added to the user's registry. A feature content item may enable the user to perform an action in the client application. A guide content item may provide instructional content related to the user's registry event. A social network content item may display content from an external social network. The content items may also include a video content item and a sample registry.

After creating the first session, the content feed server 140 creates a content feed history for the user and adds the first session to the user's content feed history (step 230). The content feed server 140 then provides the user's content feed history (i.e., the first session) to the client application 150 and sets an expiration time for the first session (step 240). The client application 150 renders user content feed in the user interface (i.e., displays the content items in the first session) (step 250).

At a later time, the user then returns to the feed, and the client application 150 requests additional content feed (step 255). In certain embodiments, the client application 150 requests a new session every time a user returns to the content feed, and, in response to receiving such requests, the content feed server 140 checks if the most recent session has expired. In certain embodiments, content feed updates are requested in the background when the content feed application 150 realizes that the current session has expired. In this embodiment, the content feed server 140 may set the duration of the session and the client application 150 may track the expiration time based on the duration and the time the user first views the session.

In this example the first session has expired, and, therefore, the content feed server 140 creates a second session for the user with additional content items related to the user's registry or the user's registry event where the additional content items have a selection type and a format type (step 260). As with the first session (and all subsequent sessions), content items may include predetermined content associated with a session count, priority content items, and user-dependent dynamic content added based on the user's event timeline, items already in the user's registry, content item priority status, user preferences, user geography, and season of the event.

The content feed server 140 adds the second session to the top of the user's feed history and moves the first session lower in the feed history (i.e., feed history includes first session and second session) (step 270). The content feed server 140 then provides the user's feed history (i.e., the first and second sessions) to the client application 150 and sets the expiration time for the second session (step 280). The client application 150 renders the user content feed in the user interface with the second session content items at the top of the feed (step 290) and the first session items lower down in the feed.

When the second session expires, steps 260-290 are repeated for a number of iterations with respect to subsequent new sessions (i.e., the session count is incremented with each iteration) 295 such that, with each iteration, a different new session is added to the user's feed history. In certain embodiments, the number of iterations depends on the number of times over a period of time that the user views the content feed. For a plurality of the sessions, the session includes a content item having an ecommerce format type and a content item having a time-to-event selection type.

In certain embodiments, creating at least one session includes selecting for the session any priority content items active at the time of creating the session (where the priority content items are displayed at the top of the session), selecting one or more session-based content items associated with a session identifier for the session, and customizing the session for the user by adding one or more time-to-event content items based on the user's event timeline. In certain embodiments, customizing the session further comprises selecting one or more content items based on one or more of the following: user preferences, products that have been added to the user's registry, user geography, and season of the registry event.

Figure 3:
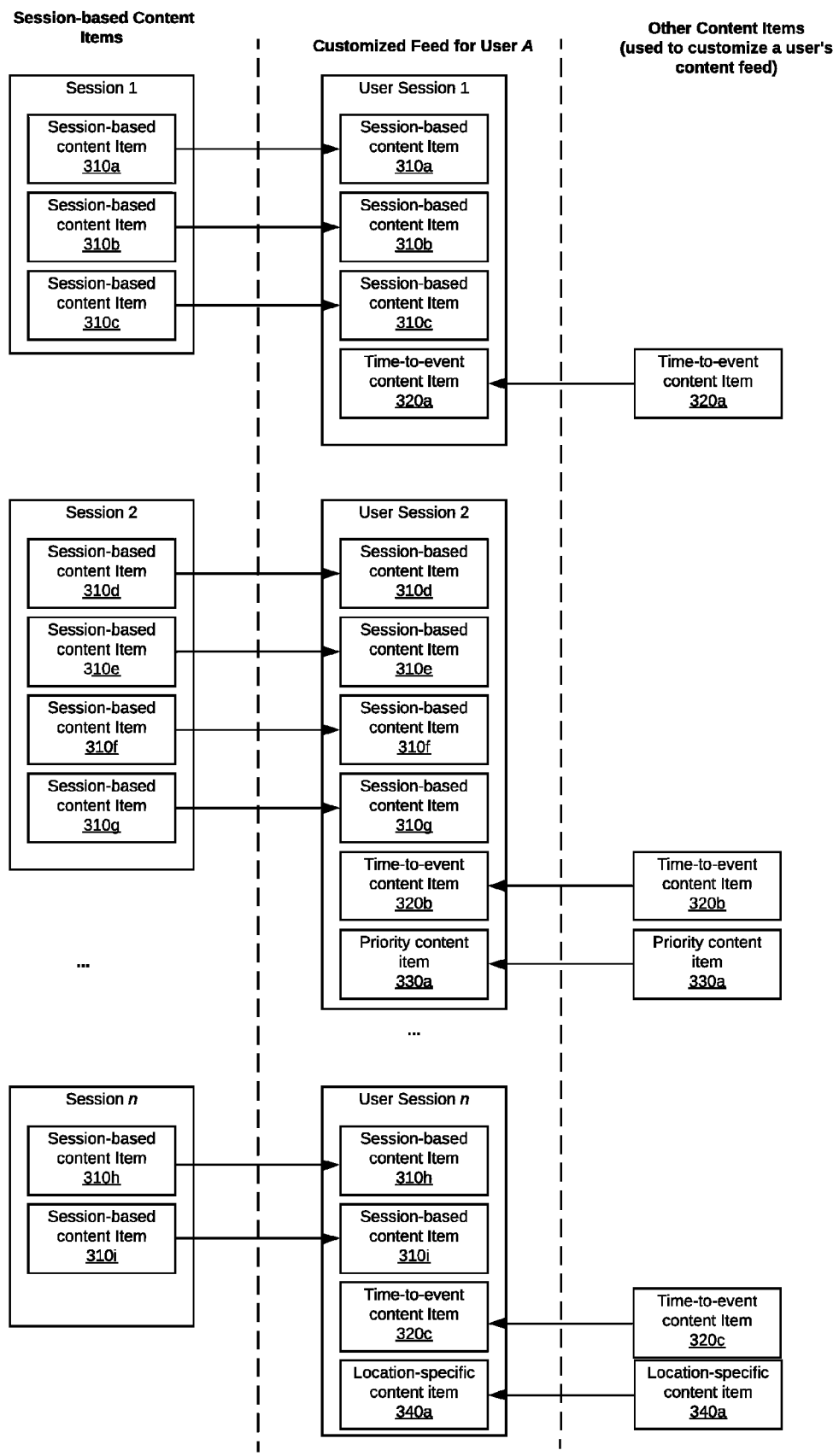
FIG. 3 is a diagram that illustrates how content items are grouped together into sessions according to one embodiment.

FIG. 3 is a diagram that illustrates an example of how content items are grouped together into sessions according to one embodiment. As seen in FIG. 3, the customized feed for User A includes a plurality of iterative sessions (e.g., User Session 1, User Session 2, until User Session n). Each session includes content items having a selection type. The selection type can include predetermined content, such as session-based content items 310a-310i, priority content items 330a, and/or user-dependent dynamic content, such as time-to-event content items 320a-320c, location-specific content items 340a, etc. With respect to User Session 1, the content feed server 140 selects session-based content items 310a, 310b, 310c and time-to-event content item 320a to send to the client application for display in the user interface. With respect to User Session 2, the content feed server 140 selects session-based content items 310d, 310e, 310f, 310g, time-to-event content item 320b, and priority content item 330a to send to the client application for display in the user interface. The content feed server 140 continues to select content items for the next successive iterations of sessions until User Session n, where the content feed server 140 selects session-based content items 310h, 310i, time-to-event content item 320c, and location-specific content item 340a to send to the client application for display in the user interface.

Figure 4:
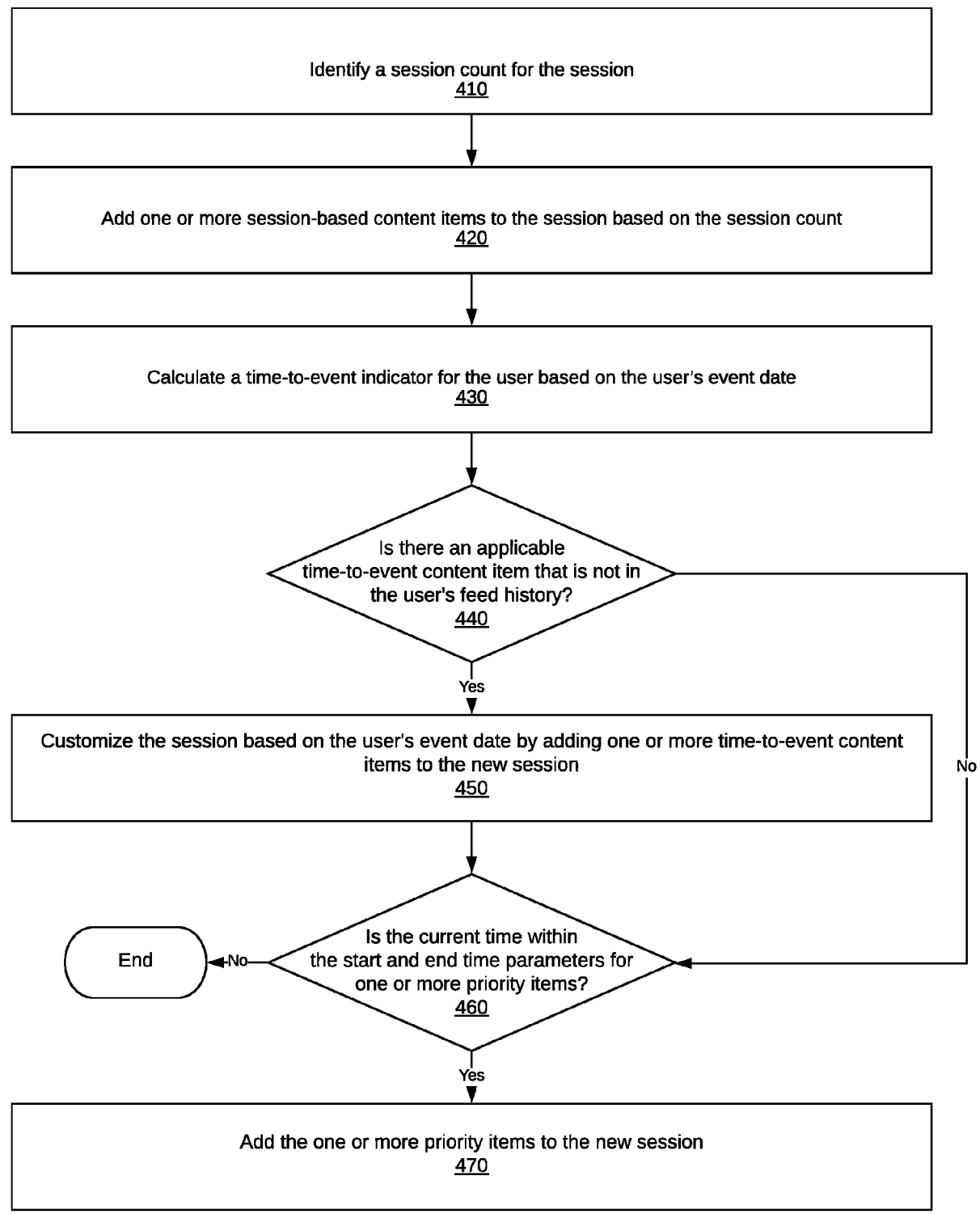
FIG. 4 is a flowchart that illustrates a method, according to one embodiment, for creating a session for a user.

FIG. 4 illustrates an example method, according to one embodiment, performed by the content feed server 140 for creating a session for a user. In this example, there are three selection types for content items: session-based content items, priority content items, and time-to-event content items.

Referring to FIG. 4, a session count is identified for the session 410. One or more session-based content items are added to the session based on the session count 420. A time-to-event indicator is calculated for the user based on the user's event date 430. The content feed server 140 determines whether there is an applicable time-to-event content item that is not in the user's feed history 440. In response to there being an applicable time-to-event content item that is not in the user's feed history, the session is customized based on the user's event date by adding one or more time-to-event content items to the new session 450. Otherwise, the content feed server 140 determines whether the current time is within the start and end time parameters for one or more priority items 460. In response to the current time being within the start and end time parameters for one or more priority items, the one or more priority items are added to the new session 470. The session is then sent to the client application for display in the user interface.

In certain embodiments, the content items are pulled into the datastore 110, 120, 130 at regularly reoccurring intervals (e.g., every four hours) by fetching all of the content entries. When the user views the user interface, a request is sent to the content feed server 140 to fetch the relevant content items for the user. The content feed server 140 creates a customized feed based on the user's current session number and event date. Each time a session is viewed for the first time, the time of viewing is recorded in a database. When subsequent requests for content feed are received, this timestamp is compared to the current time to determine if a new session should be fetched and included on the top of the feed. If more than eight hours have elapsed since the last session view, the next session worth of content items is included in the response.

In certain embodiments, a session view is determined by the client application, which passes a parameter to an API when it wants to record a view. The above duration analysis is only done when the request is considered a view. In cases where the client application fetches the feed in the background, it does not record this as a view.

In certain embodiments, recording a session view only starts a timer when a user interacts with or scrolls through the content feed. Each time a session is viewed for the first time, references to the specific items to be included in the content feed are stored in a database on a per-user basis. Content items are then continually added to the content feed on a per-user basis as the current session number advances. Storing the content items on a per-user basis allows the system to preserve the sequencing of items so that the feed history does not change per user.

In certain embodiments, real-time content can be delivered in between sessions. For example, the user can receive a real-time alert in between sessions that someone has purchased a product on his or her registry.

Figure 5A:
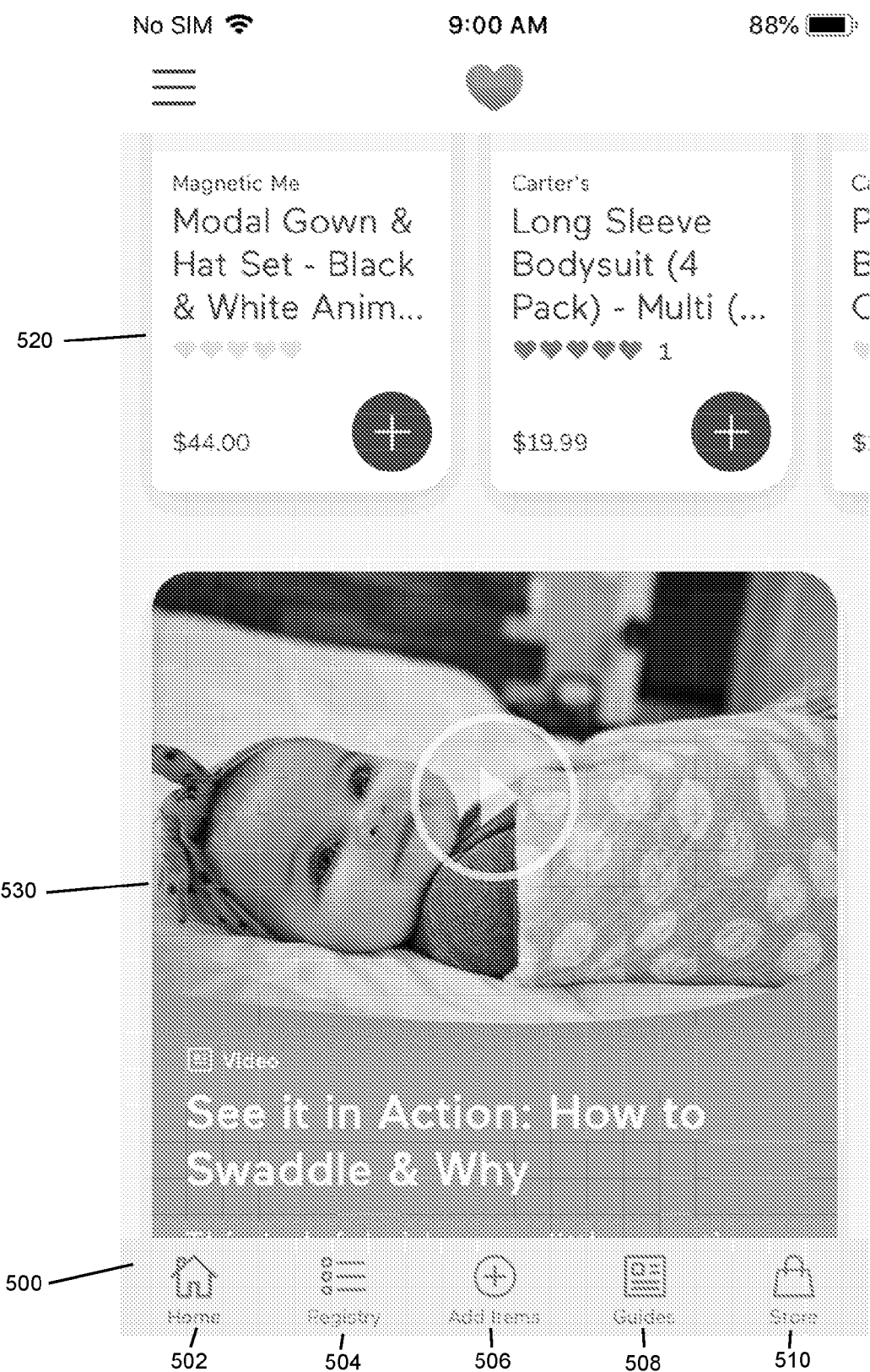
FIGS. 5A-5G are screenshots that illustrate exemplary content items in a user interface according to one embodiment.

FIGS. 5A-5G are screenshots that illustrate exemplary content items in a user interface according to one embodiment. As seen in FIG. 5A, the user interface has a toolbar 500 comprising a plurality of selectable buttons that provide quick access to features of the user interface. For example, the buttons provided in this user interface include a home button 502, a registry button 504, an add items button 506, a guides button 508, and a store button 510. FIG. 5A also illustrates two format types of content items - an ecommerce content item 520 and a video content item 530. The ecommerce content item 520 includes products that can be added to the user's registry. The video content item 530 provides information related to the user's registry or registry event.

Figure 5B:
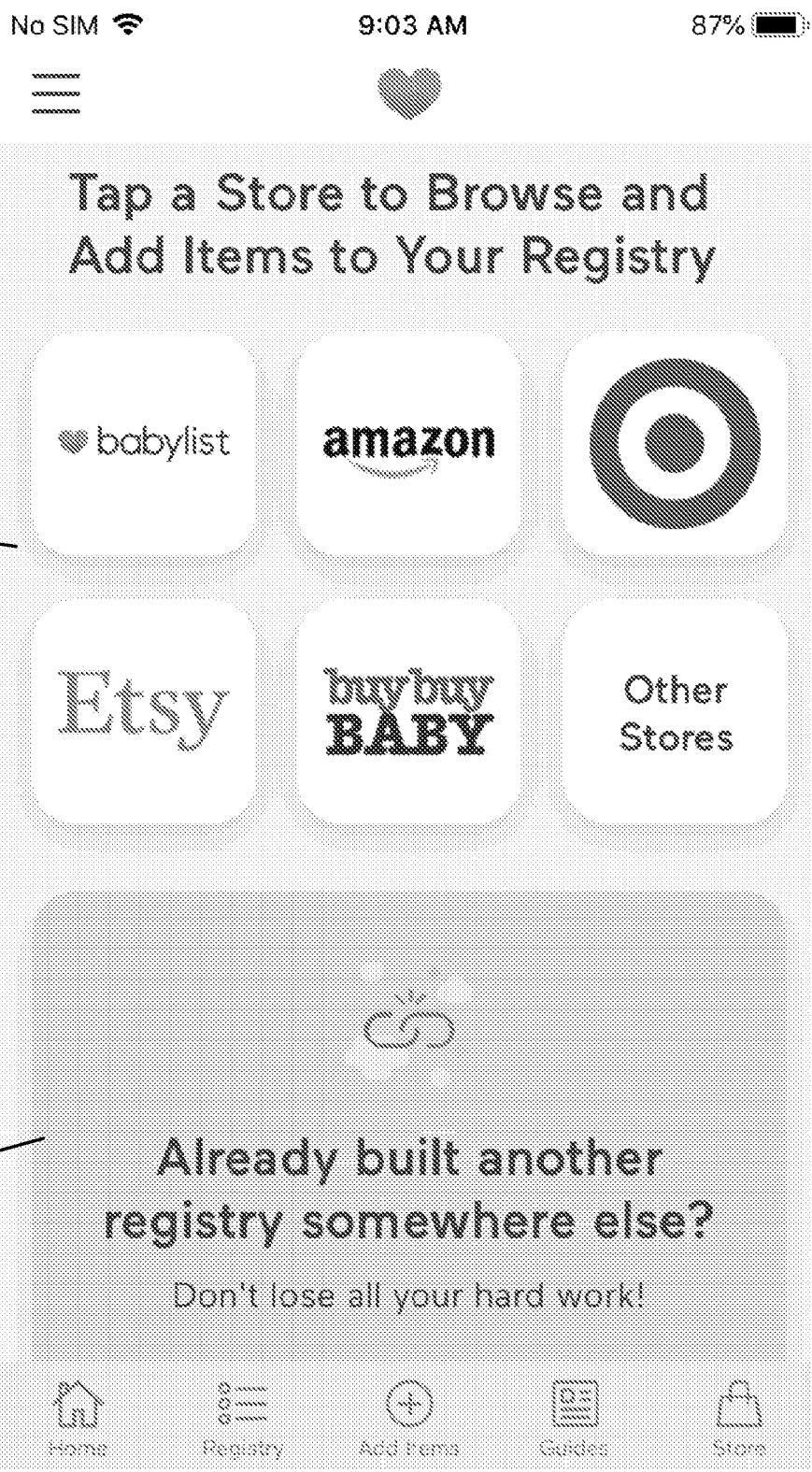
Figure 5C:

FIGS. 5B-5C illustrate three examples of another format type for a content item - the feature content item. The feature content item enables a user to perform an action in the client application. As seen in FIG. 5B, a user is able to add items to his or her registry 540 or transfer a registry that was built somewhere else 550. As seen in FIG. 5C, a user is able to create a checklist of registry items, for example, in this case, by answering questions on a quiz.

Figure 5D:
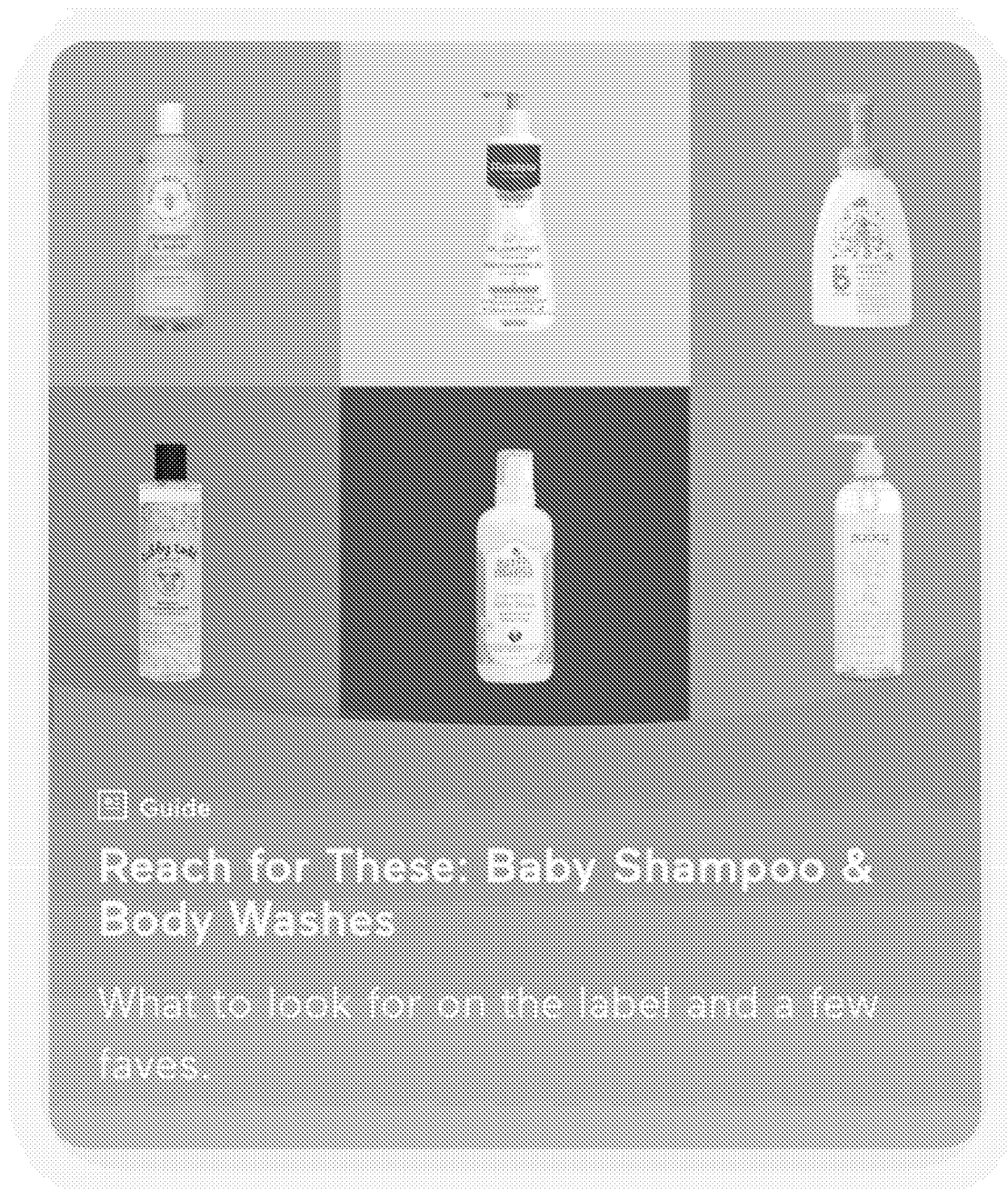
Figure 5E:
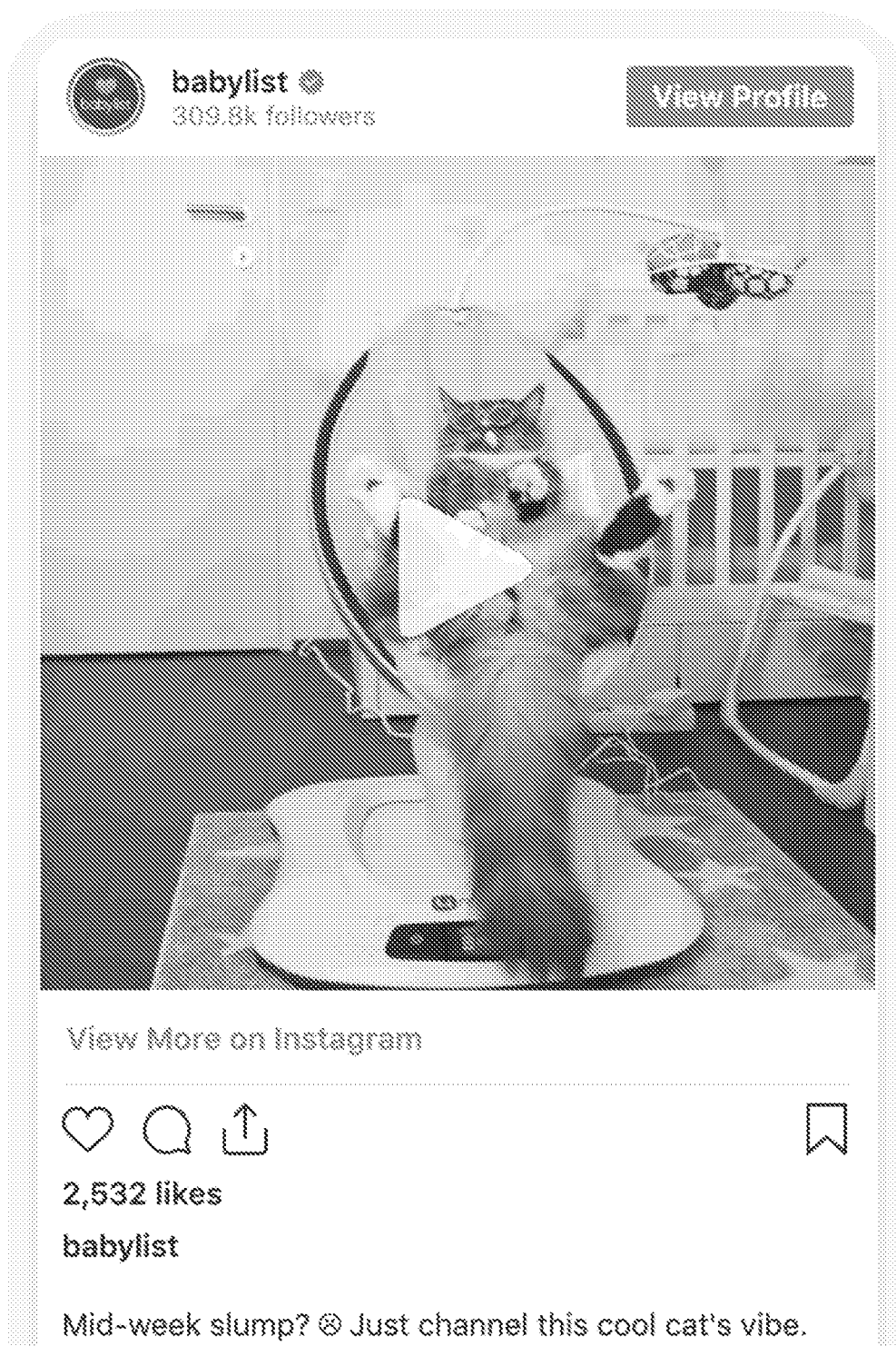
Figure 5F:
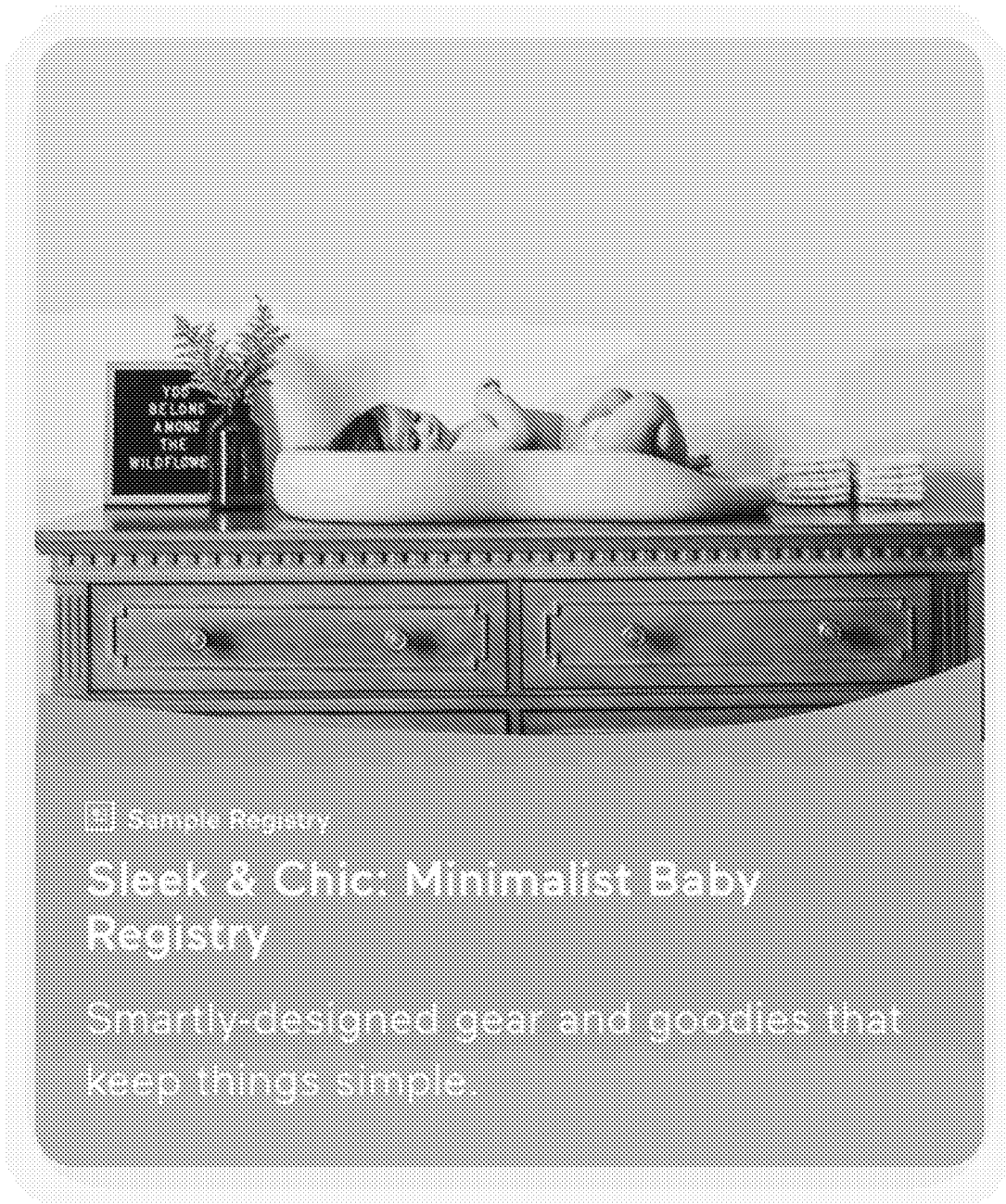

FIG. 5D illustrates another format type for content items - a guide content item. A guide content item provides instructional content related to the user's registry event. In this case, the guide content item is an article teaching parents what to look for on baby shampoo and body wash labels and possible recommendations. FIG. 5E illustrates another format type of content items - a social network content item. A social network content item displays content from an external social network. In this case, the social network content item is a humorous Instagram post. FIG. 5F illustrates another format type of content items - a sample registry content item. In this case, the sample registry content item is an article that suggests baby items geared towards simplicity.

Figure 5G:

FIG. 5G illustrates an example of a time-to-event content item for a user who is currently 20 weeks pregnant.

The methods described with respect to FIGS. 1-5G are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for providing a content feed to a user related to a registry and a registry event having an event timeline, the method comprising:
   receiving at a content feed server a first request for a content feed for a user from a client application;
   providing, by the content feed server, a first session of content items to the client application for publishing in a user interface of the client application, wherein providing the first session comprises:
      creating a first session for the user with a plurality of content items related to the user's registry or the user's registry event and wherein each content item has a selection type and a format type,
      adding the first session to a feed history for the user,
      setting an expiration time for the first session, and
      publishing the feed history including the content items in the first session in the user interface of the client application;
   receiving at the content feed server a second request for the content feed for the user from the client application;
   determining, by the content feed server, that the first session has expired;
   in response to receiving the second request and determining that the first session has expired, providing, by the content feed server, a second session of content items to the client application for publishing in the user interface of the client application, wherein providing the second session comprises:
      creating a second session for the user with a plurality of new content items related to the user's registry or the user's registry event and wherein each new content item has a selection type and a format type,
      adding the second session to the feed history for the user such that the feed history includes the expired first session and the second session,
      setting an expiration time for the second session, and
      publishing the feed history including the content items in the expired first session and the second session in the user interface of the client application,
   wherein creating the first session and the second session for the user comprises:
      identifying a session count for each of the first session and the second session,
      adding one or more predetermined session-based content items to the first session and the second session,
      wherein the predetermined session-based content items are content selected for all users and inserted into the first session and the second session based on the session count,
      calculating a time-to-event indicator for the user based on an event date of the user's registry event,
      determining whether there are one or more user-dependent dynamic time-to-event content items that are not in the user's feed history, wherein the one or more user-dependent dynamic time-to-event content items are personalized to the user,
      in response to determining that there are one or more user-dependent dynamic time-to-event content items that are not in the user's feed history, customizing at least one of the first session and the second session based on the user's event date by adding the one or more user-dependent dynamic time-to-event content items to at least one of the first session and the second session,
      determining whether a current time is within start and end time parameters for one or more active priority content items, and
      in response to determining that the current time is within the start and end time parameters for one or more active priority content items, adding the one or more active priority content items to at least one of the first session and the second session; and
   repeating, by the content feed server, steps of determining that a previous session has expired, and providing a subsequent new session for a number of iterations such that, with each iteration, a different new session is added to the user's feed history, the user's feed history including the content items in all expired previous sessions and the different new session are published in the user interface of the client application grouped by session, and wherein a plurality of sessions include a content item having an ecommerce format type, a content item having a feature format type, a content item having a guide format type, a content item having a social network format type, a content item having a video format type, a content item having a sample registry format type, and a content item having a time-to-event selection type.

2. The method of claim 1, wherein the computer system maintains a datastore that includes content items having the following selection types: session-based content items, time-to-event content items, and priority content items.

3. The method of claim 1, wherein customizing the session further comprises selecting one or more content items based on one or more of the following: user preferences, products that have been added to the user's registry, user geography, and season of the registry event.

4. The method of claim 1, wherein the content items in the plurality of the sessions have the following format types:
   an ecommerce content item that includes products that can be added to the user's registry;
   a feature content item that enables the user to perform an action in the application;
   a guide content item that provides instructional content related to the user's registry event;
   a social network content item that displays content from an external social network;
   a video content item; and
   a sample registry.

5. The method of claim 1, wherein the number of iterations depends on a number of times over a period of time that the user views the content feed.

6. A non-transitory computer-readable medium comprising a computer program, that, when executed by a computer system, enables the computer system to perform the following steps for providing a content feed to a user related to a registry and a registry event having an event timeline, the steps comprising:

receiving at a content feed server a first request for a content feed for a user from a client application;

providing, by the content feed server, a first session of content items to the client application for publishing in a user interface of the client application, wherein providing the first session comprises:

creating a first session for the user with a plurality of content items related to the user's registry or the user's registry event and wherein each content item has a selection type and a format type, adding the first session to a feed history for the user, setting an expiration time for the first session, and publishing the feed history including the content items in the first session in the user interface of the client application;

receiving at the content feed server a second request for the content feed for the user from the client application;

determining, by the content feed server, that the first session has expired;

in response to receiving the second request and determining that the first session has expired, providing, by the content feed server, a second session of content items to the client application for publishing in the user interface of the client application, wherein providing the second session comprises:

creating a second session for the user with a plurality of new content items related to the user's registry or the user's registry event and wherein each new content item has a selection type and a format type, adding the second session to the feed history for the user such that the feed history includes the expired first session and the second session, setting an expiration time for the second session, and publishing the feed history including the content items in the expired first session and the second session in the user interface of the client application, wherein creating the first session and the second session for the user comprises:

identifying a session count for each of the first session and the second session, adding one or more predetermined session-based content items to the first and the second session, wherein the predetermined session-based content items are content selected for all users and inserted into the first and the second session based on the session count, calculating a time-to-event indicator for the user based on an event date of the user's registry event date, determining whether there are one or more user-dependent dynamic time-to-event content items that are not in the user's feed history, wherein the one or more user-dependent dynamic time-to-event content items are personalized to the user, in response to determining that there are one or more user-dependent dynamic time-to-event content items that are not in the user's feed history, customizing at least one of the first session and the second session based on the user's event date by adding the one or more user-dependent dynamic time-to-event content items to at least one of the first session and the second session, determining whether a current time is within start and end time parameters for one or more active priority content items, and in response to determining that the current time is within the start and end time parameters for one or more active priority content items, adding the one or more active priority content items to at least one of the first session and the second session; and repeating, by the content feed server, steps of determining that a previous session has expired, and providing a subsequent new session for a number of iterations such that, with each iteration, a different new session is added to the user's feed history, the user's feed history including the content items in all expired previous sessions and the different new session are published in the user interface of the client application grouped by session, and wherein a plurality of the sessions include a content item having an ecommerce format type, a content item having a feature format type, a content item having a guide format type, a content item having a social network format type, a content item having a video format type, a content item having a sample registry format type, and a content item having a time-to-event selection type.

7. The non-transitory computer-readable medium of claim 6, wherein the computer system maintains a datastore that includes content items having the following selection types: session-based content items, time-to-event content items, and priority content items.

8. The non-transitory computer-readable medium of claim 6, wherein customizing the session further comprises selecting one or more content items based on one or more of the following: user preferences, products that have been added to the user's registry, user geography, and season of the registry event.

9. The non-transitory computer-readable medium of claim 6, wherein the content items in the plurality of the sessions have the following format types:

an ecommerce content item that includes products that can be added to the user's registry;

a feature content item that enables the user to perform an action in the application;

a guide content item that provides instructional content related to the user's registry event;

a social network content item that displays content from an external social network;

a video content item; and a sample registry.

10. The non-transitory computer-readable medium of claim 6, wherein the number of iterations depends on a number of times over a period of time that the user views the content feed.

11. A computer system for providing a content feed to a user related to a registry and a registry event having an event timeline, the system comprising:

one or more processors;

one or more memory units coupled to the one or more processors, wherein the one or more memory units store instructions that, when executed by the one or more processors, cause the system to perform the operations of:

receiving at a content feed server a first request for a content feed for a user from a client application;

providing, by the content feed server, a first session of content items to the client application for publishing in a user interface of the client application, wherein providing the first session comprises:

creating a first session for the user with a plurality of content items related to the user's registry or the user's registry event and wherein each content item has a selection type and a format type,
adding the first session to a feed history for the user,
setting an expiration time for the first session, and
publishing the feed history including the content items in the first session in the user interface of the client application;
receiving at the content feed server a second request for the content feed for the user from the client application;
determining, by the content feed server, that the first session has expired;
in response to receiving the second request and determining that the first session has expired, providing, by the content feed server, a second session of content items to the client application for publishing in the user interface of the client application, wherein providing the second session comprises:
creating a second session for the user with a plurality of new content items related to the user's registry or the user's registry event and wherein each new content item has a selection type and a format type,
adding the second session to the feed history for the user such that the feed history includes the expired first session and the second session,
setting an expiration time for the second session, and
publishing the feed history including the content items in the expired first session and the second session in the user interface of the client application,
wherein creating the first session and the second session for the user comprises:
identifying a session count for each of the first session and the second session,
adding one or more predetermined session-based content items to the first session and the second session, wherein the predetermined session-based content items are content selected for all users and inserted into the first session and the second session based on the session count,
calculating a time-to-event indicator for the user based on an event date of the user's registry event date,
determining whether there are one or more user-dependent dynamic time-to-event content items that are not in the user's feed history, wherein the one or more user-dependent dynamic time-to-event content items are personalized to the user,
in response to determining that there are one or more user-dependent dynamic time-to-event content items that are not in the user's feed history, customizing at least one of the first session and the second session based on the user's event date by adding the one or more user-dependent dynamic time-to-event content items to at least one of the first session and the second session,
determining whether a current time is within start and end time parameters for one or more active priority content items, and
in response to determining that the current time is within the start and end time parameters for one or more active priority content items, adding the one or more active priority content items to at least one of the first session and the second session; and
repeating, by the content feed server, steps of determining that a previous session has expired, and providing a subsequent new session for a number of iterations such that, with each iteration, a different new session is added to the user's feed history, the user's feed history including the content items in all expired previous sessions and the different new session are published in the user interface of the client application grouped by session, and wherein a plurality of sessions include a content item having an ecommerce format type, a content item having a feature format type, a content item having a guide format type, a content item having a social network format type, a content item having a video format type, a content item having a sample registry format type, and a content item having a time-to-event selection type.

12. The computer system of claim 11, wherein the computer system maintains a datastore that includes content items having the following selection types: session-based content items, time-to-event content items, and priority content items.

13. The computer system of claim 11, wherein customizing the session further comprises selecting one or more content items based on one or more of the following: user preferences, products that have been added to the user's registry, user geography, and season of the registry event.

14. The computer system of claim 11, wherein the content items in the plurality of the sessions have the following format types:
an ecommerce content item that includes products that can be added to the user's registry;
a feature content item that enables the user to perform an action in the application;
a guide content item that provides instructional content related to the user's registry event;
a social network content item that displays content from an external social network;
a video content item; and
a sample registry.

15. The computer system of claim 11, wherein the number of iterations depends on a number of times over a period of time that the user views the content feed.

* * * * *

UNITED STATES PATENT AND TRADEMARK OFFICE
CERTIFICATE OF CORRECTION

| | | |
|---|---|---|
| PATENT NO. | : 11,743,353 B1 | Page 1 of 1 |
| APPLICATION NO. | : 16/719610 | |
| DATED | : August 29, 2023 | |
| INVENTOR(S) | : Flanagan et al. | |

It is certified that error appears in the above-identified patent and that said Letters Patent is hereby corrected as shown below:

In the Claims

- Column 9, Line 54 (Claim 6): please replace "registry event date" with --registry event--

- Column 11, Line 41 (Claim 11): please replace "registry event date" with --registry event--

Signed and Sealed this
Seventeenth Day of October, 2023

*Katherine Kelly Vidal*

Katherine Kelly Vidal
*Director of the United States Patent and Trademark Office*